United States Patent [19]

Ting

[11] 4,072,770

[45] Feb. 7, 1978

[54] U.V. CURABLE POLY(ESTER-URETHANE) POLYACRYLATE POLYMERS AND WET LOOK COATINGS THEREFROM

[75] Inventor: Vincent Wen-Hwa Ting, Brunswick, Ohio

[73] Assignee: SCM Corporation, New York, N.Y.

[21] Appl. No.: 685,373

[22] Filed: May 11, 1976

[51] Int. Cl.$^2$ .............................................. B05D 3/06
[52] U.S. Cl. ...................................... 427/54; 427/53; 260/859 R; 204/159.15; 204/159.23
[58] Field of Search ............. 260/858, 859 R, 75 NP, 260/75 NT; 427/44, 54, 53; 204/159.15, 159.23

[56] References Cited

U.S. PATENT DOCUMENTS

| 3,673,140 | 6/1972 | Ackerman et al. | 260/859 R |
| 3,954,714 | 5/1976 | Kuehn | 260/859 R |

Primary Examiner—John H. Newsome
Attorney, Agent, or Firm—A. Joseph Gibbons

[57] ABSTRACT

Polyester-urethane polymers, prepared from the reaction of specific molar ratios of diisocyanates with specific mixtures of polyesterdiols, glycols, triols and tetraols, and having 4-10 reactive isocyanate groups are further reacted with hydroxyalkyl acrylates through the free isocyanate functionality to provide oligomers having from about 4-10 acrylates units per each mole unit of polyurethane chain. Such polymers when cross-linked under ultraviolet radiation in the presence of photosensitizers, specific reactive monofunctional acrylate solvents and multifunctional acrylate cross-linking agents cure without air inhibition to yield superior "wet look" finishes especially useful for coating metal, wood and floor tile.

15 Claims, No Drawings

U.V. CURABLE POLY(ESTER-URETHANE) POLYACRYLATE POLYMERS AND WET LOOK COATINGS THEREFROM

BACKGROUND OF THE INVENTION

Subsequent to the development of cellular polyurethane foams, single component polyurethane compositions were developed for coating applications. In general the most desirable urethane coatings are based on polyester and polyacrylate modified polyurethane formulations. The prior art compositions, exemplified generally by U.S. Pat. Nos. 3,652,506, 3,509,234 and 3,782,961, are unsuitable for providing "wet look" coatings in that they usually require the coatings to be prepared and used in an inert atmosphere, require the particular substrate to be preheated prior to the application of the urethane coating and/or require an "ionizing radiation" curing step. The instant compositions, in contrast, are not air-inhibited and polymerize and cure under ultraviolet radiation to superior "wet look" finishes at ambient temperatures without the use of a protective atmosphere.

SUMMARY OF THE INVENTION

This invention relates to coating composition and process comprising a polyurethane polymer obtained by reacting a polyurethane intermediate having 4 to 10 terminally-positioned reactive isocyanate groups with 4 to 10 molar equivalents of a hydroxy (lower) alkyl acrylate or methacrylate, said intermediate resulting from the reaction of 1–5 moles of polyester diol having a molecular weight in the range of 500–12,000; 2 to 6 moles of a monomer polyol having at least 3 reactive hydroxyl groups and containing 3 to 10 carbon atoms; and 6 to 24 moles of an organic diisocyanate.

One object of this invention is to produce a radiation curable coating comprising a photosensitizer, the above-described polyurethane oligomer, a monofunctional acrylate monomer, and a multifunctional acrylate cross-linking agent, said coatings having higher cross-linking densities and higher curing speeds than found in conventional urethane coatings.

Another object is to provide a process for coating particular substrates with polyurethane polymers which do not require the substrate to be heated prior to the application of the coating and which may be cured under ambient atmosphere conditions without air inhibition wherein said process comprises:

a. forming a coating composition by mixing together on a weight percent basis 30 to 70 percent of the above described polyurethane polymer, 10 to 40 percent of a monofunctional acrylate monomer, 5 to 50 percent of a multifunctional acrylate cross-linking agent and 3 to 5 percent of a photosensitizer, said compositions totaling 100 percent and wherein said monofunctional acrylate monomer is selected from the group consisting of phenyl Cellosolve acrylate (Cellosolve is a trademark of Carbide & Carbon Chemicals Corporation), isobornylacrylate and benzylacrylate, b. applying said mixture as a 1–10 mil thick coating to a substrate selected from the group consisting of flat stock metal, wood, plastic, cloth, paper, fiberboard, and floor tile; and c. curing said coated substrate in air at ambient temperature by passing the substrate at a rate from 10 to 1000 foot/minute through an effective field of ultraviolet radiation.

Still another object is to provide "wet look" poly(ester-urethane) polyacrylate coatings, based on the above described composition and process, having exceptional adhesion, flexibility, stain resistance, mar and impact resistance and to provide finished products coated with such U.V. curable compositions.

DETAILED DESCRIPTION

The above objects are obtained through the use of specific isocyanateterminated prepolymers or oligomers, having at least 4 and preferably 5 to 10 reactive isocyanate units, obtained by reacting various multihydroxy components including polyesterdiols, aliphatic diols, monomer aliphatic triols and/or tetraols with diisocyanates in such proportion to produce the above noted isocyanate-substituted prepolymers. The free isocyanate groups are further reacted with hydroxyalkyl acrylates and/or hydroxyalkyl methacrylates to produce a polyurethane polymer having 4 to 10 terminal acrylate functional groups. The resulting polyurethane polymer having ethylenically reactive double bonds in the acrylates moiety is formulated into a U.V. curable coating by adding one or more monofunctional acrylate monomers, a multifunctional acrylate cross-linking agent and one or more photosensitizers. Such compositions are not inhibited by air and are readily curable by ultraviolet radiation at room temperature and thus represent a desirable advance over the urethane coatings of the prior art. "Wet look" coatings based on these compositions have not heretofore been prepared.

The diols especially useful for the purpose of preparing "wet look" finishes of the present invention include the common polyalkylenether glycols, polyesterdiols, minor proportions of monomer lower alkyldiols and mixtures thereof. The polyalkylenether glycols, polyesterdiols, minor proportions of monomer lower alkyldiols and mixtures thereof. The polyalkylenether glycols are given by the general formula $H(OR)_nOH$, wherein R is alkylene radical containing one to eight carbon atoms and preferably two to four carbon atoms and n is an integer chosen to provide molecular weights of the diol in the range of about 100 to 10,000. Especially preferred are the polypropylene glycols having a molecular weight in the range of 350 to 4600, used either alone or in conjunction with minor proportions of short chain diols.

The polyester glycols are given by the general formula

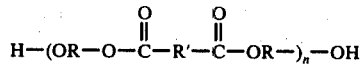

wherein R is equivalent to the alkylene radical defined above for the polyalkylenether glycols; R' is R, an arylene radical or an alkyarylalkylene radical having from 6 to 12 carbon atoms. Especially useful are polyester diols having molecular weights in the range of 500 to 12,000, used either alone or in conjunction with minor proportions of short chain alkylene diols. Such polyester diols are well known to the coatings art. Those polyester diols prepared from adipic acid, 1,4-cyclohexane dimethanol hydrogenated bisphenol A and hexane diol are preferred because of their availability and the desirable properties in the resultant "wet look" cured films.

With regard to the monomer polyols useful in preparing the instant polyurethane intermediates and oligomers, monomer triols and tetraols having 3 to 12 carbon atoms and at least three reactive hydroxy groups are particularly suited. Preferred monomer polyols include trimethylol propane, trimethylol ethane, glycerine, polycaprolactone triols, polyether triols, polyester triols and pentaerythritol.

Examples of hydroxyalkyl acrylates and methacrylates useful for imparting the functional unsaturated units necessary for the cross-linking cure reaction include 2-hydroxyethyl acrylate, 2-hydroxyethyl methacrylate and their corresponding propyl and butyl derivatives. Also included in this category are the monomethacrylate and monoacrylates of diethylene glycol, glycerol, trimethylol propane and pentaerythritol. Further examples include di- and tri-acrylates and methacrylates of the above mentioned glycols provided that at least one free hydroxy group remains for reactions with each of the 4 to 10 functional isocyanate groups on the polyurethane chain. Other useful hydroxy acrylates include N-hydroxymethyl methacrylamide and N-hydroxymethyl acryl amide. A preferred reactant is trimethylol propane diacrylate and especially preferred is 2-hydroxyethyl acrylate because of its availability and the characteristics imparted to the resultant coating.

Diisocyanates which are useful in preparing the urethane polymers include a variety of organic diisocyanates capable of reacting with the abovementioned diols, triols, and tetraols. These include aromatic, aliphatic and cycloaliphatic diisocyanates and polyisocyanates and mixtures of two or more which are well known to the urethane art. Representative compounds include toluene-2,4-diisocyanate, m-phenylene diisocyanate, 1,5-naphthylene diisocyanate, 1,4-tetramethylene diisocyanate, 1,6-hexamethylene diisocyanate, 1,10-decamethylene diisocyanate, 1,4-cyclo-hexylene diisocyanate, 4,4' methylene-bis(cyclohexyl isocyanate), 1,5-tetrahydronaphthylene diisocyanate and 1,4-xylylene diisocyanate. Especially preferred is isophorone diisocyanate because of the desirable properties imparted to the urethane polymer.

In order to provide the required 4 to 10 terminally-positioned reactive isocyanate groups on the polyurethane intermediate and the corresponding 4 to 10 molar equivalents of the cross-linkable units of carbon-to-carbon unsaturation provided by the hydroxy (lower) acrylate and/or methacrylate reactants, it is necessary to control closely within the ranges indicated below the molar proportions of the following reactants:
  a. 1 to 7 moles of polyester diol having a molecular weight in the range of 100 to 10,000;
  b. 2 to 8 moles of a monomer polyol having from 3 to 12 carbon atoms and having at least three reactive hydroxy groups;
  c. 6 to 24 moles of an organic diisocyanate; and
  d. 4 to 10 moles of the hydroxy (lower) acrylate or methacrylate.

The above defined molar proportions of reactants are more properly exemplified and understood with reference to the following table:

| Polyester Diol | Molar Quantities of Reactants | | |
|---|---|---|---|
| | Monomer Polyol | Diisocyanate | Hydroxyacrylate |
| 1 | 2 | 6 | 4 |
| 2 | 2 | 7 | 4 |
| 2 | 3 | 9 | 5 |
| 1 | 3 | 8 | 5 |
| 2 | 4 | 11 | 7 |
| 5 | 6 | 18 | 8 |
| 7 | 8 | 24 | 10 |

Because it is desirable in most cases to maintain a high degree of linearity in the polyurethane intermediate and oligomer, the monomer polyol ingredients should be selected with considerable excess of monomer triol with respect to polyols having more than three reactive hydroxyl groups. Thus the use of pentaerythritol must be limited in the initial formation of the linear polyurethane intermediates. Where it is desirable to have maximum functionality on the linear polyurethane intermediate it is suggested that a higher proportion of monomer polyols having hydroxyl functionality in excess of three (i.e., pentaerythritol) can be used by first reacting the triol monomers to produce essentially a linear polymer and then in a second stage completing the reaction with pentaerythritol polyol components.

The choice of monofunctional acrylate reactant or solvent is especially critical in providing "wet look" coatings of the present invention. Useful reactive monomers include 2-ethylhexyl acrylate, n-butyl acrylate, Cellosolve acrylate, benzyl acrylate, isobornyl acrylates, and the corresponding methacrylates.

Useful multifunctional acrylate cross-linking agents for the purposes of forming the "wet look" coatings of the present invention include melamine acrylate, trimethylolpropane triacrylate, pentaerythritol triacrylate, epoxidized oil acrylate, neopentylglycol diacrylate, 1,6-hexanediol diacrylate and the corresponding methacrylates.

The photosensitizers of photoinitiators useful in the practice of this invention are those known to the art of curing polymers having reactive (curable) carbon-to-carbon unsaturated linkages and include cyanines, triphenylmethane dyestuffs and derivatives of benzanthrone, quinone and anthraquinone and their respective halogen substituted products. Aromatic ketone sensitizers include acetophenone, benzophenone, fluorenone and benzoin. Other suitable photoinitiators include, for example, benzoin methyl ethers, benzoin ethyl ether, didesyl ether, desyl bromide, desyl chloride, desyl amine, polychlorinated polyphenyl resins, polychlorinated diphenyls, polychlorinated triphenyls, and mixtures of the two, chlorinated rubbers, copolymers of vinyl chloride and vinyl isobutyl ether, chlorinated parafins, mono- and polychlorobenzenes, mono- and polybromobenzenes, mono- and polychloroxylenes, mono- and polybromoxylenes, dichlormaleic anhydride, halogenated polyolefins, such as chlorinated polyethylene, 2,4-dimethylbenzene sulfonyl chloride, 1-bromo-3-(m-phenoxyphenoxy benzene), 2-bromoethylmethyl ether, chlorendic anhydride and mixtures of these.

Various alkoxy derivatives of acetophenone are especially suitable sensitizers either when used alone or in conjunction with other sensitizers. A combination of diethoxyacetophenone and benzophenone is a preferred photosensitizer for the present curing purposes. Other lower alkoxy acetopheneones which may be substituted include dimethoxy, dipropoxy, dibutoxy and corresponding derivatives containing up to eight carbon atoms in the said alkoxy moiety. For economy and availability the diethoxy derivative is most preferred. The photoinitiators or sensitizers can be used in amounts ranging between 0.1 and 10 percent by weight of the complete photopolymerizable composition, and preferably from about 2 to 5 percent. The radiation curable composition may include, if desired, about 0.1 to 2.0 percent, based on the weight of the total composition, of an accelerating agent, including, for example, mercaptans and their derivatives, i.e., ethyl mercaptoacetate, amine oxides, such as bis(2-hydroxyethyl) cocoamine oxide and bis (2-hydroxyethyl) octadecylamine oxide as well as other common accelerators known to the art.

The photopolymerizable compositions of the present invention are utilized for metal coatings and particularly for providing a high gloss "wet look" wood-grain finish in the metal decorative and can making industries. Other substrates which may be coated include wood, paper, cloth, fiberboard and plastic. The coatings are conventionally applied by gravure, reverse or direct roll or by spray coating processes. Commonly used modifiers including colorants, pigments, wetting agents, leveling agents may be included in the U.V. polymerizable compositions as necessary. Modifying agents typically are used in amounts ranging from about 1 to 60 weight percent based on the total weight of the photopolymerizable compositions.

Examples of metals which can be coated include sized and unsized tin plate and aluminum flat stock. The present compositions are especially useful in imparting a "wet look" to metal surfaces previously primer-coated and decorated with epoxy primers. A durable coating can be applied to a variety of floor tile including vinyl, asbestos and their combinations.

Irradiation of the compositions may be accomplished by any one or a combination of a variety of methods. The composition may be exposed, for example, to actinic light from any source and of any type as long as it furnishes an effective amount of ultraviolet radiation needed for proper cure. The compositions polymerizable by actinic light generally exhibit their maximum sensitivity in the range of about 1,800 A to 4,000 A, and preferably about 2,000 A to 3,000 A. Suitable sources include, but are not limited to, carbon arcs, mercury-vapor arcs, fluorescent lamps with special ultraviolet light-emitting phosphors, argon glow lamps, photographic flood lamps, and so forth. The time of irradiation must be long enough to effect a proper cure. Curing of the coating applied to various substrates is conveniently conducted at ambient temperatures by passing the substrate at a rate of from 10 to 1000 foot/minute through an effective field of ultraviolet radiation.

The following specific examples illustrate only a limited number of embodiments; accordingly, the invention is not limited thereto. All parts and percentages being by weight, temperatures degrees Centigrade, and molecular weights reported as number average molecular weights unless otherwise specified.

EXAMPLE 1

Preparation of Poly(ester)urethane Polyacrylate

Into a dry reactor equipped with a packed steam condenser, with agitation and under a $N_2$ sparge are charged 24.89 pounds ester diol 204 (Union Carbide see notes to Table 1) and 15.29 pounds adipic acid. The mixture is reacted at between 150° C. and 220° C. and water of reaction is removed. When the reaction is greater than 85 percent complete, 1.20 pounds of toluene is added and the remaining water of reaction is removed by azeotropic distillation to yield an acid value of less than 10. A slight vacuum is then applied to remove remaining water and toluene. The composition and physical properties of the polyester diol A is shown in Table 1. The reaction mixture is cooled below 80° C. and a dry air sparge is substituted for the nitrogen blanket. Thereupon 2.42 pounds trimethylol propane, 33.10 pounds isobornyl acrylate, 0.02 pounds p-methoxy hydroquinone (MEHQ), and 12.18 pounds isophorone diisocyanate are added and the batch temperature is allowed to rise to 80° C. and held at that temperature for 1 hour. Thereupon 2.71 pounds isobornyl acrylate and 0.05 pounds dibutyltin dilaurate are added over a 30-60 minute interval, moderating the exotherm and maintaining the temperature at 80° C. After completion of addition, the temperature is maintained at 80°-85° C. for 2 hours. A mixture of 4.35 pounds 2-hydroxyethyl acrylate and 0.02 pounds p-methoxy hydroquinone is added over a 30 to 60 minute interval. Reaction is continued for 3 hours until complete as indicated by a zero free isocyanate analysis. Thereupon 0.01 pounds of p-methoxy hydroquinone is added, the reaction product stirred for thirty minutes and then stored in dry, lined, closed containers. Excellent stability of the stored polymer was observed.

EXAMPLE 2

The polyurethane oligomer of Example 1 was formulated by blending together 60.42 parts polyurethane oligomer of Example 1 (60% solids in isobornyl acrylate), 14.5 parts melamine acrylate, 12.08 parts isobornyl acrylate, 10.0 parts N-vinyl pyrrolidone, 2.0 parts benzophenone and 1.00 parts diethoxy acetophenone. The resulting coating composition having a viscosity of 500–600 cps/25° C. was applied by reverse rollercoater to a 0.0235 inch inked flat stock aluminum substrate previously primed with an epoxy primer, and was subjected to an Ashdee medium pressure Mercury light source (200 watt/inch) at a line speed of 22.5 ft./min. under ambient temperature and normal air atmosphere to give a 3 mil thick "wet look" film. The film exhibited good mar resistance, hardness, flexibility, impact and adhesion as indicated in Table 2.

EXAMPLES 3–5

In a manner corresponding to the process of Example 1, acrylate terminated polyester polyurethane oligomers were prepared from the polyester diols shown in Table 1. The respective identified Resins B, C, and D oligomers were formulated from various monoacrylate monomer as indicated in Table 3. Coatings prepared from each of these compositions and identified as Examples 3, 4 and 5 yield satisfactory "wet look" coatings when applied to aluminum flat stock and irradiated with ultraviolet radiation according to the procedure of Example 2. Data and properties of the cured films are given in Table 2.

TABLE 1

| Composition and Constants of Polyester Diols | | | | |
|---|---|---|---|---|
| Polyester Diol | B | A | C | D |
| Reactants | Moles | Moles | Moles | Moles |
| Propylene glycol | 1.17 | | | |
| Ester Diol 204[a] | | 1.17 | | |
| 1,6-Hexane Diol | | | 1.17 | 0.82 |
| Hydrogenated bisphenol A | | | | 0.33 |
| Adipic Acid | 1.00 | 1.00 | 1.00 | 1.00 |

TABLE 1-continued

| Composition and Constants of Polyester Diols | | | | |
|---|---|---|---|---|
| Polyester Diol | B | A | C | D |
| Reactants | Moles | Moles | Moles | Moles |
| Properties | | | | |
| Acid Value | 7.6 | 7.8 | 5.2 | 7.7 |
| Hydroxyl Number | 64.1 | 37.1 | 51.7 | 46.9 |
| Equivalent weight | 875 | 1512 | 1085 | 1196 |
| Molecular Weight | 1750 | 3024 | 2170 | 2392 |

[a] Ester diol 204 - 2,2-dimethyl-3-hydroxypropyl 2,2-dimethyl-3-hydroxypropionate (from Union Carbide Chemical Corporation)

EXAMPLE 6

The resin of Example 1 was formulated according to the procedure of Example 2 with the substitution of phenylCellosolve acrylate for isobornyl acrylate. The resulting coating composition having a viscosity of 950 cps/25° C., was applied to aluminum stock substrate and irradiated as indicated in Example 2 to yield a "wet look" film having excellent mar resistance, hardness and other properties as indicated in Table 2.

EXAMPLE 7

When the formulations of Examples 1 through 6 were modified to substitute acetoxypropylacrylate, 2-ethylhexyl acrylate or benzylacrylate for all or a portion of isobornylacrylate similar satisfactory "wet look" coatings were obtained.

TABLE 2

| | DATA AND PROPERTIES OF CURED FILM | | | | |
|---|---|---|---|---|---|
| Example No. | 3 | 2 | 4 | 5 | 6 |
| Light Source: | * | * | * | * | * |
| Line Speed (ft/min): | 22.5 | 22.5 | 22.5 | 22.5 | 22.5 |
| Film Thickness (mils): | 2.5 – 3.0 | 2.5 – 3.0 | 2.5 – 3.0 | 2.5 – 3.0 | 2.5 – 3.0 |
| Mar Resistance: | Good | Good | Good | Good | Good |
| Hardness: | 2H | 2H | H | 2H | 2H |
| Gloss: | clear, wet look | clear, wet look | clear, wet look | clear, wet look | clear, wet look |
| Cross-hatch Adhesion: | 100% passes | 100% passes | 100% passes | 100% passes | 100% passes |
| Reverse Impact, in-26: | passes 60 | passes 60 | passes 60 | passes 60 | passes 60 |
| Flexibility: | excellent, passes sharp 90° bend-post bake at 200° F. for 5 minutes | excellent, passes sharp 90° bend-post bake at 200° F. for 5 minutes | good, passes ⅛ inch conical Mandrel bend. Passes sharp 90° bend. | excellent, passes sharp 90° bend-post bake at 200° F. for 5 minutes | excellent, passes sharp 90° bend-post bake at 200° F. for 5 minutes |

*Medium Pressure Mercury Bulb (Ashdee).

TABLE 3

| Composition and Constants of Poly(ester-urethane) Polyacrylate Resins | | | | |
|---|---|---|---|---|
| Reactants: | Resin B Moles | Resin A Moles | Resin C Moles | Resin D Moles |
| Polyester Diols: | | | | |
| B | 2.0 | | | |
| A | | 2.0 | | |
| C | | | 2.0 | |
| D | | | | 2.0 |
| Trimethylol Propane | 3.0 | 3.0 | 3.0 | 3.0 |
| Isophorone Diisocyanate | 9.0 | 9.0 | 9.0 | 9.0 |
| 2-Hydroxyethyl Acrylate | 5.25 | 5.25 | 5.25 | 5.25 |
| Resin Constants: | | | | |
| NV | 60 | 60 | 50 | 60 |
| Reactive Monomer[a] | IBA | IBA | IBA | IBA |
| Viscosity: (G-H): | Z-8 | Z-5 | Z | Z-4 |

[a] IBA - Isobornyl Acrylate

What is claimed is:

1. A poly(ester-urethane) polyacrylate polymer comprising the product obtained by reacting a polyurethane intermediate having 4 to 10 terminally-positioned reactive isocyanate groups with 4 to 10 molar equivalents of a hydroxy (lower) acrylate or methacrylate said intermediate resulting from the reaction of 1 to 7 moles of a polyester diol having a molecular weight in the range of 500 to 12,000; 2 to 8 moles of a monomer polyol having 3 to 12 carbon atoms and at least 3 reactive hydroxyl groups; and 6 to 24 moles of an organic diisocyanate.

2. The polymer of claim 1 wherein the polyester diol comprises the reaction product of adipic acid and a diol selected from the group consisting of 1,6-hexanediol, 1,4-cyclohexane dimethanol and hydrogenated bisphenol A; the monomer polyol is trimethylolpropane; the diiocyanate is isiphorone diisocynate; and the hydroxyacrylate is hydroxyethyl acrylate.

3. The composition of claim 2 wherein the molar ratio of polyester:trimethyolpropane:dissocyanate:hydroxyacrylate is 2:3:9:5.

4. A U.V. curable composition comprising on a weight percent basis 30 to 70 percent of a polyurethane polymer of claim 1; 10 to 40 percent of a monofunctional acrylate monomer; 5 to 50 percent of multifunctional acrylate cross-linking agent and 3 to 5 percent of a photosensitizer, said composition totaling 100 percent.

5. The composition of claim 4 wherein the polyurethane intermediate comprises the reaction product of 2 moles of a polyester diol, 3 moles of monomer polyol and 9 moles of organic diisocyanate, said intermediate being further reacted with 5 moles of hydroxyalkylacrylate.

6. The composition of claim 4 wherein the polyurethane intermediate is prepared using 1 mole of polyesterdiol having a molecular weight of 1250, 2 moles of trimethylol propane and 6 moles of isophorone diisocyanate, said intermediate being further reacted with 4 moles of a hydroxyalkyl acrylate.

7. The composition of claim 4 wherein the photosensitizer is selected from the group consisting of benzophenone, diethoxyacetophenone and mixtures thereof.

8. The composition of claim 5 wherein the photosensitizer is a mixture comprising 1 to 3 parts benzophenone and 1 part of diethoxy acetophenone.

9. A process for imparting a wet look coating to a substrate which comprises:
 (a) forming a radiation curable composition comprising on a weight percent basis:
  (i) 30 to 70 percent of a polyurethane polymer of claim 1;
  (ii) 10 to 40 percent of a monofunctional acrylate monomer;
  (iii) 5 to 50 percent of a multifunctional acrylate cross-linking agent; and
  (iv) 3 to 5 percent of a photosensitizer said composition totaling 100 percent;
 (b) applying said mixture as a 0.1 to 10 mil thick coating to a substrate selected from the group consisting of flat stock metal, wood, fiberboard and floor tile; and (c) curing said coating substrate in air at ambient temperature by passing the substrate at a rate of from 10 to 1000 foot/minute through an effective field of ultraviolet radiation.

10. The process of claim 9 wherein the polyurethane oligomer comprises the reaction product of:
(a) a polyester diol formed from adipic acid and a diol selected from the group consisting of 1,6-hexanediol, 1,4-cyclohexane dimethanol, hydrogenated bisphenol A, and propylene glycol;
(b) a monomer polyol selected from the group consisting a trimethylol propane, trimethylol ethane, glycerine, polycaprolactone triols, pentaerythritol and mixtures thereof;
(c) isophorone diisocyanate, and
(d) hydroxyacrylate selected from the group consisting of 2-hydroxyethylacrylate, 2-hydroxy-3-chloropropyl acrylate, 2-hydroxyethyl methacrylate, 2-hydroxypropylacrylate and mixtures thereof; wherein the ratio of a:b:c:d is 2:3:9:5.

11. The process of claim 10 wherein the polyesterdiol is a propylene glycol adipate, the monomer triol is trimethylol propane, the organic diisocyanate is isophorone diisocyanate and the hydroxyacrylate is 2-hydroxyethyl acrylate.

12. The process of claim 9 wherein the acrylate monomer is selected from the group consisting of 2-phenoxyethyl acrylate, isobornyl acrylate and benzylacrylate.

13. The process of claim 9 wherein the multifunctional cross-linking agent is selected from the group consisting of melamine acrylate; pentaerythritol triacrylate, trimethylolpropane triacrylate, epoxidized soybean oil acrylate and neopentylglycol diacrylate.

14. The process of claim 13 wherein the monoacrylate monomer is isobornyl acrylate and the cross-linking agent is melamine acrylate.

15. The process of claim 12 wherein the substrate is aluminum flat stock.

* * * * *

UNITED STATES PATENT OFFICE
CERTIFICATE OF CORRECTION

Patent No. 4,072,770      Dated February 7, 1978

Inventor(s) Vincent Wen-Hwa Ting

It is certified that error appears in the above-identified patent and that said Letters Patent are hereby corrected as shown below:

Column 4, line 29, after "isobornyl acrylates," -- phenyl Cellosolve acrylate (Cellosolve is a trademark of Carbide & Carbon Chemicals Corporation) -- should be inserted.

line 68, change "derivates" to -- derivatives --.

Column 8, line 8, change "diiocyanate is isiphorone diisocynate" to -- diisocyanate is isophorone diisocyanate --.

Signed and Sealed this

Fourth Day of July 1978

[SEAL]

Attest:

RUTH C. MASON
*Attesting Officer*

DONALD W. BANNER
*Commissioner of Patents and Trademarks*